United States Patent [19]
Brown

[11] 3,741,036
[45] June 26, 1973

[54] VEHICLE TRANSMISSION CONTROL SYSTEMS

[75] Inventor: Robert Hulme Brown, Surrey, England

[73] Assignee: C.A.V. Limited, Birmingham, England

[22] Filed: Jan. 27, 1971

[21] Appl. No.: 110,238

[30] Foreign Application Priority Data
Feb. 10, 1970   Great Britain.................... 6,244/70

[52] U.S. Cl. ................................ 74/752 D, 74/866
[51] Int. Cl. ....................... F16h 3/74, B60k 21/00
[58] Field of Search........................... 74/752 D, 866

[56] References Cited
UNITED STATES PATENTS
3,640,156   2/1972   Mori et al. ......................... 74/866
3,354,744   11/1967   Kuhnle et al. ..................... 74/866 X
3,448,640   6/1969   Nelson ................................. 74/866

Primary Examiner—Arthur T. McKeon
Attorney—Holman & Stern

[57] ABSTRACT

A vehicle transmission control system including a plurality of solenoids each of which when energized causes engagement of a particular forward gear ratio of a vehicle gear box, a manually operable selector switch whereby a particular solenoid can be energized and a plurality of switches in series with one or more of the solenoids respectively. Means in the form of transistor and a generator is provided to control the operation of the switches respectively whereby energization of each solenoid can only occur if the road speed of the vehicle is below a predetermined value.

7 Claims, 2 Drawing Figures

PATENTED JUN 26 1973    3,741,036

INVENTOR
Robert Hulme Brown
HOLMAN & STERN
ATTORNEYS

VEHICLE TRANSMISSION CONTROL SYSTEMS

This invention relates to vehicle transmission control systems of the kind including a plurality of solenoids each of which when energized, causes engagement of a particular forward gear ratio of the vehicle gearbox, and a manually operable selector switch whereby a particular solenoid can be energized.

With such a system there is a danger in that whilst the vehicle is in motion, the driver of the vehicle may move the selector switch to a position in which the engine of the vehicle may be over speeded. Such an action besides causing over speeding of the engine will impose an excessive strain upon the vehicle transmission.

The object of the invention is to provide a control system of the kind specified in which engagement of a gear which would result in over speeding of the engine is prevented.

According to the invention a control system of the kind specified includes switches in circuit with one or more of the solenoids respectively and means responsive to the road speed of the vehicle being provided to control the operation of said switches respectively whereby energization of each solenoid can only occur if the road speed of the vehicle is below a predetermined value.

Figure 1:
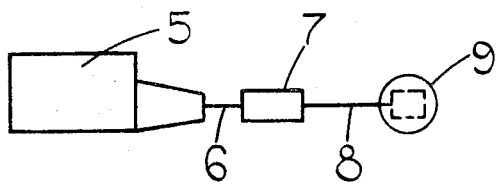
Figure 2:
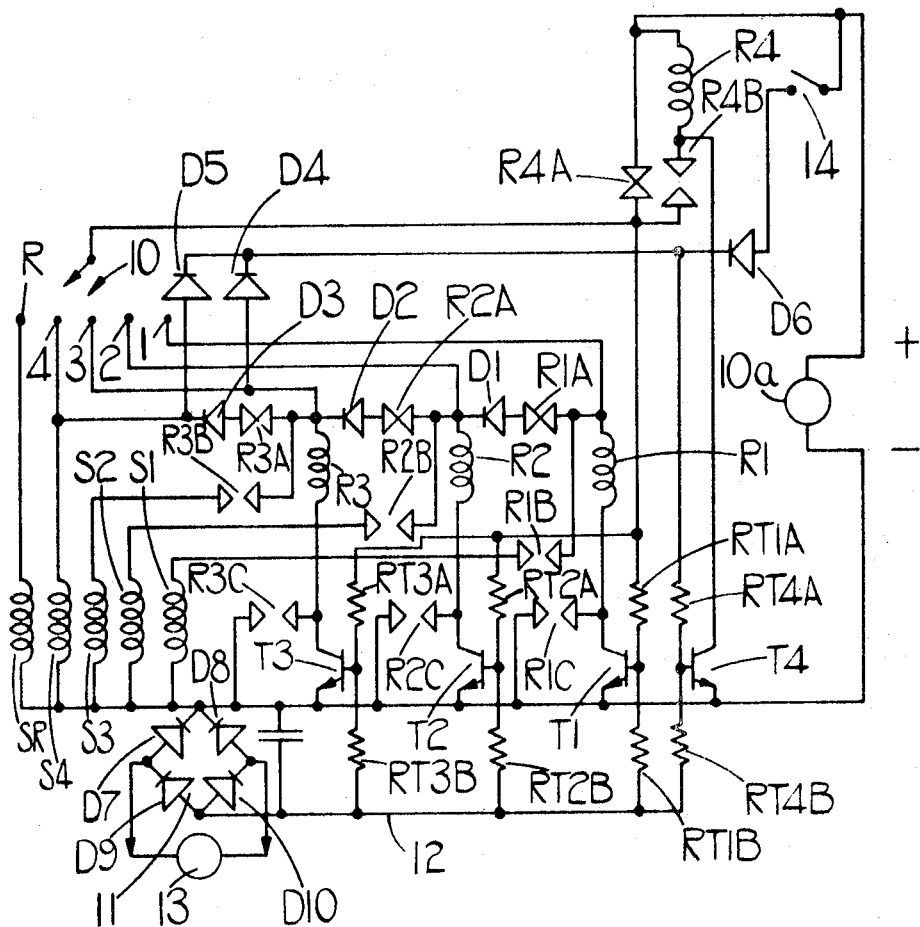

One example of a vehicle transmission control system will now be described with reference to the accompanying drawings in which:

FIG. 1 shows a schematic layout of a vehicle transmission to which the system can be applied, and FIG. 2 is a circuit diagram of the transmission control system.

With reference to FIG. 1 the vehicle transmission includes an engine and clutch 5 connected through a drive shaft 6 to a gearbox 7 of the epicyclic type. The gearbox is connected through a propeller shaft 8 to the road wheels 9 of the vehicle. The selection of the ratios of the gearbox is by means of fluid pressure operable piston cylinder combinations (not shown) and the application of fluid pressure to the piston cylinder combinations is controlled by solenoid operable valves respectively. Such systems are well known and the association of the valves and mechanical portions of the gearbox are shown in the specification of U.S. Pat. No. 3448640.

With reference now to FIG. 2 there are provided solenoids S1, S2, S3 and S4 and a further solenoid SR. These solenoids when energized, effect engagement of a particular gear ratio of the vehicle gearbox. Solenoid SR is associated with the valve which controls engagement of the reverse gear and solenoids S1, S2, S3 and S4 are associated with the four forward gears of the gearbox. When no solenoid is energized no gear is selected and hence the gearbox can be said to be in neutral. Solenoid S4 is associated with the normal running gear of the vehicle and solenoids S3, S2 and S1 with the gears which for a given road speed progressively require an increase of engine speed.

For controlling the operation of the gearbox there is provided a manually operable selector switch 10 having a single movable wiper contact which can contact fixed contacts R,4,3,2,1, depending on the position of the lever. At one end each solenoid is connected to the negative terminal of a source 10a of d.c. supply and the other ends of solenoids SR and S4 are connected respectively to fixed contacts R,4. The wiper contact of the switch 10 is connected to the positive terminal of the source 10a by way of a pair of normally closed contacts R4A of a relay R4. In parallel with the contacts R4A is the series combination of the relay coil and a pair of normally open contacts R4B, one end of the relay coil being connected to the positive supply terminal.

The free end of solenoid S1 is connected by way of normally open contacts R1B of a relay R1 to fixed contact 1 of the switch 10 and in like manner the free ends of solenoids S2 and S3 are connected to the fixed contacts 2 and 3 of the switch 10 by way of normally open contacts R2B and R3B respectively of relays R2 and R3. Moreover, an end of the coils of the relays R1, R2 and R3 is connected respectively to fixed contacts 1, 2 and 3 of the switch. The other ends of the relay coils are connected respectively to the collector terminals of n-p-n transistors T1, T2, T3 the emitter terminals of which are connected to the negative supply terminal. Furthermore, the collector emitter paths of transistors T1, T2, T3 are bridged respectively by normally open relay contacts R1C, R2C, R3C associated with the relays R1, R2, R3.

Also provided is a full wave rectifier unit 11 the positive output terminal of which is connected to the negative supply terminal and the negative output terminal of which is connected to a negative rail 12. Connected between the negative supply terminal and the negative rail 12 is a smoothing capacitor. The input terminals of the rectifier unit 11 are connected to the output terminals of an a.c. generator 13 the output voltage of which varies in accordance with the speed at which the vehicle is driven. The base terminals of the transistors T1, T2, T3 are connected to the negative rail 12 by way of resistors RT1B, RT2B and RT3B respectively and they are connected to the wiper contact of the switch 10 by way of resistors RT1A, RT2A and RT3A respectively.

There is also provided an n-p-n transistor T4 having its emitter terminal connected to the negative supply terminal and its collector terminal connected to the end of the coil of relay R4 which is not directly connected to the positive supply terminal. The base terminal of transistor T4 is connected to the negative rail 12 byway of resistor RT4B and by way of resistor RT4A to the cathodes of a pair of diodes D4, D5. The anodes of these diodes are connected to fixed contacts 3, 4 of the switch 10 respectively. Furthermore, connected between fixed contacts 1 and 2, 2 and 3, 3 and 4, of the switch 10 are series circuits consisting of diode D1 and normally closed relay contacts R1A, diode D2 and normally closed relay contacts R2A, diode D3 and normally closed relay contacts R3A, respectively.

The operation of the circuit so far described is as follows, assuming that the switch 10 is moved into position to energize solenoid S4. Solenoid S4 is directly connected to the fixed contact 4 of the switch 10 and will therefore be energized from the supply by way of relay contacts R4A. If the switch 10 is now moved to the position to energize solenoid S3, solenoid S4 will be de-energized and solenoid S3 energized providing contacts R3B are closed. If these contacts are not closed due to the relay coil of relay R3 not being energized then solenoid S4 will be re-energized by way of relay contacts R3A and diode D3. The relay coil of relay R3 will be energized if transistor T3 is in a condition to allow collector emitter current i.e., if its base voltage is sufficiently positive. The voltage on the base is determined by the relative values of resistors RT3A and RT3B and the voltage on the negative rail 12. This latter voltage depends upon the speed of the vehicle and as the speed increases so the voltage on the base terminals of the transistors moves negatively until a point is reached at which the transistor cannot conduct. If the speed of the vehicle is sufficiently low when the gear is selected then the relay coil of relay R3 will be energized and the sets of contacts will be operated. Contacts R3C close to form a hold circuit for the relay coil and contacts R3B close to energize solenoid S3 and contacts R3A open to prevent energization of solenoid S4.

The same action occurs if the selector switch is moved to energize solenoids S2 and S1. The ratios of the resistors associated with the base terminals of the transistors are chosen to accord with the speeds at which the various gears can be selected. The selector switch is arranged so that every time it is operated then the supply to the relay coils is broken thereby breaking the relay hold on circuit.

Transistor T4 and its associated circuitry are provided to ensure that the vehicle can only be moved from rest in specific gear ratios. Transistor T4 is only able to conduct when the vehicle is at rest and if the selector switch is moved to energize solenoids S3 or S4. In these two positions by way of the diodes D4 or D5 respectively, the base voltage is such that current flow through the collector emitter path occurs and the relay coil of relay R4 is energized. Contacts R4A open to prevent current flow of a sufficient magnitude to operate the solenoids and contacts R4B close to maintain the relay coil energized this holding current being of low magnitude. The holding current is broken when the selector switch 10 is moved.

As an added safety measure the transistor T4 can also be rendered conductive at any position of the selector switch 10 by means of a pressure sensitive switch 14 which is associated with a diode D6. Thus if the pressure available to operate the gear selector mechanism is too low, the transistor T4 will conduct and the relay coil of relay R4 will be energized thereby preventing any of the solenoids being energized.

Having thus described my invention what I claim as new and desire to secure by Letters Patent is:

1. A control circuit for a vehicle transmission system having a plurality of selectable gear ratios and a plurality of solenoids for effecting engagement of said ratios respectively, said control circuit comprising a manually operable selector switching means operable to cause energization of said solenoids in turn, said control circuit also comprising a switch circuit in series with at least one of said solenoids and means responsive to the road speed of the vehicle to control the operation of said switch whereby energization of said solenoid can occur only if the road speed of the vehicle is below a predetermined value.

2. A circuit as claimed in claim 1 in which said switch circuit comprises: a normally open pair of contacts; a relay coil for operating said contacts, a transistor having the relay coil connected in its collector emitter path, and means for supplying a voltage to the base of the transistor, said voltage being variable in accordance with the road speed of the vehicle, said voltage having a magnitude to prevent conduction of the transistor in the event that the vehicle speed is above the safe speed at which the particular gear ratio can be selected.

3. A circuit as claimed in claim 2 in which said relay coil is connected in circuit with the selector switching means when the particular gear ratio is selected.

4. A circuit as claimed in claim 3 including a further pair of normally open contacts in parallel with said transistor said normally open pair of contacts being closed by the relay with which the transistor is associated, said further pair of normally open contacts constituting a holding circuit for the associated relay.

5. A circuit as claimed in claim 4 in which a further transistor, relay coil, a normally open pair of relay contacts and a further pair of normally open pairs of relay contacts are provided to control another of said solenoids, the circuit also including pairs of normally closed contacts associated with the relays respectively, each pair of normally closed contacts serving to maintain the previous solenoid energized in the event that energization of a selected solenoid is prevented.

6. A circuit as claimed in claim 2 in which the means for supplying a voltage to the base of the transistor comprises a generator the output voltage of which varies in accordance with the road speed at which the vehicle is driven, and a resistance network associated with the transistor so that the conduction of the transistor will be prevented at an appropriate speed.

7. A circuit as claimed in claim 5 including a further transistor and a further relay, the coil of the further relay being connected in the collector emitter path of the further transistor, said further transistor being energized when the vehicle is at rest and when the selector switch is in one or more selected positions, said further relay including a pair of normally closed contacts through which current flows to the solenoids.

* * * * *